United States Patent
Fukano et al.

(10) Patent No.: US 7,383,741 B2
(45) Date of Patent: Jun. 10, 2008

(54) FLOW RATE-MEASURING APPARATUS

(75) Inventors: Yoshihiro Fukano, Moriya (JP); Takamitsu Suzuki, Joso (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/688,257

(22) Filed: Mar. 20, 2007

(65) Prior Publication Data
US 2007/0227263 A1    Oct. 4, 2007

(30) Foreign Application Priority Data
Mar. 29, 2006    (JP) .............................. 2006-090186

(51) Int. Cl.
G01F 1/66    (2006.01)
(52) U.S. Cl. ................................. 73/861.27
(58) Field of Classification Search ............. 73/861.29, 73/861.31, 861.28, 861.27
See application file for complete search history.

(56) References Cited

U.S. PATENT DOCUMENTS

| 4,065,958 | A | * | 1/1978 | Krylova et al. ............. 73/64.53 |
| 4,365,518 | A | * | 12/1982 | Zacharias, Jr. ........... 73/861.31 |
| 5,458,004 | A |  | 10/1995 | van der Pol |
| 2005/0044966 | A1 | * | 3/2005 | Gysling et al. .......... 73/861.26 |
| 2007/0151364 | A1 | * | 7/2007 | Wiest et al. ............. 73/861.27 |

FOREIGN PATENT DOCUMENTS

JP    7-83715    3/1995

* cited by examiner

*Primary Examiner*—Jewel Thompson
(74) *Attorney, Agent, or Firm*—Paul A. Guss

(57) ABSTRACT

A flow rate-measuring apparatus comprises a housing having a passage for supplying a liquid thereto, and a pair of detecting sections provided at both ends of the housing, and which contain sonic wave transmitter/receiver sections capable of transmitting and receiving sonic wave signals. Cover members are installed on each of the detecting sections, wherein the cover members face the passage in the housing. Curved surfaces, which expand toward the passage, are provided respectively on ends of the cover members.

14 Claims, 7 Drawing Sheets

FLOW RATE-MEASURING APPARATUS

BACKGROUND OF THE INVENTION

1. Field of the Invention

The present invention relates to a flow rate-measuring apparatus for detecting the flow rate of a liquid on the basis of a difference in propagation velocity obtained when sonic waves are propagated via the liquid.

2. Description of the Related Art

A flow rate-measuring apparatus has been hitherto known, which comprises, for example, a pair of transmitter/receiver units arranged on upstream and downstream sides of a conduit through which a fluid flows, wherein ultrasonic waves transmitted from one transmitter/receiver unit are reflected by an inner wall surface of the conduit and the ultrasonic waves are received by the other transmitter/receiver unit in order to measure a flow velocity or flow rate of the fluid, on the basis of a difference in propagation velocity of the ultrasonic waves.

As shown in FIG. 7, such a flow rate-measuring apparatus 1 comprises a measuring conduit 4, which includes a supply conduit 2 for supplying the liquid and a discharge conduit 3 for discharging the liquid. A first measuring head 5 is provided at one end of the measuring conduit 4, and a second measuring head 6 is provided at the other end of the measuring conduit 4. The first and second measuring heads 5, 6 have transducers therein, which function as a sonic wave transmitter or a sonic wave receiver. For example, a pulsed sonic wave signal is transmitted from the first measuring head 5, wherein the second measuring head 6, which serves as the sonic wave receiver, receives the sonic wave signal. Subsequently, the first measuring head 5 is switched so as to function as a receiver, to receive a sonic wave signal transmitted from the second measuring head 6 (see Japanese Laid-Open Patent Publication No. 7-83715).

In the case of the conventional technique disclosed in Japanese Laid-Open Patent Publication No. 7-83715, when bubbles are contained in the liquid, such bubbles adhere to the inner wall surface of the measuring conduit 4, which is disposed in opposition to the first and second measuring heads 5, 6. The bubbles 7 inhibit propagation of the sonic wave signals, making it impossible for the first and second measuring heads 5, 6 to accurately receive the sonic wave signals. As a result, it is difficult to correctly measure the flow rate of the liquid on the basis of sonic wave signals.

SUMMARY OF THE INVENTION

A general object of the present invention is to provide a flow rate-measuring apparatus, in which sonic wave signals can be reliably propagated, thus enabling the flow rate of a liquid to be measured highly accurately on the basis of sonic wave signals detected by a detecting section.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
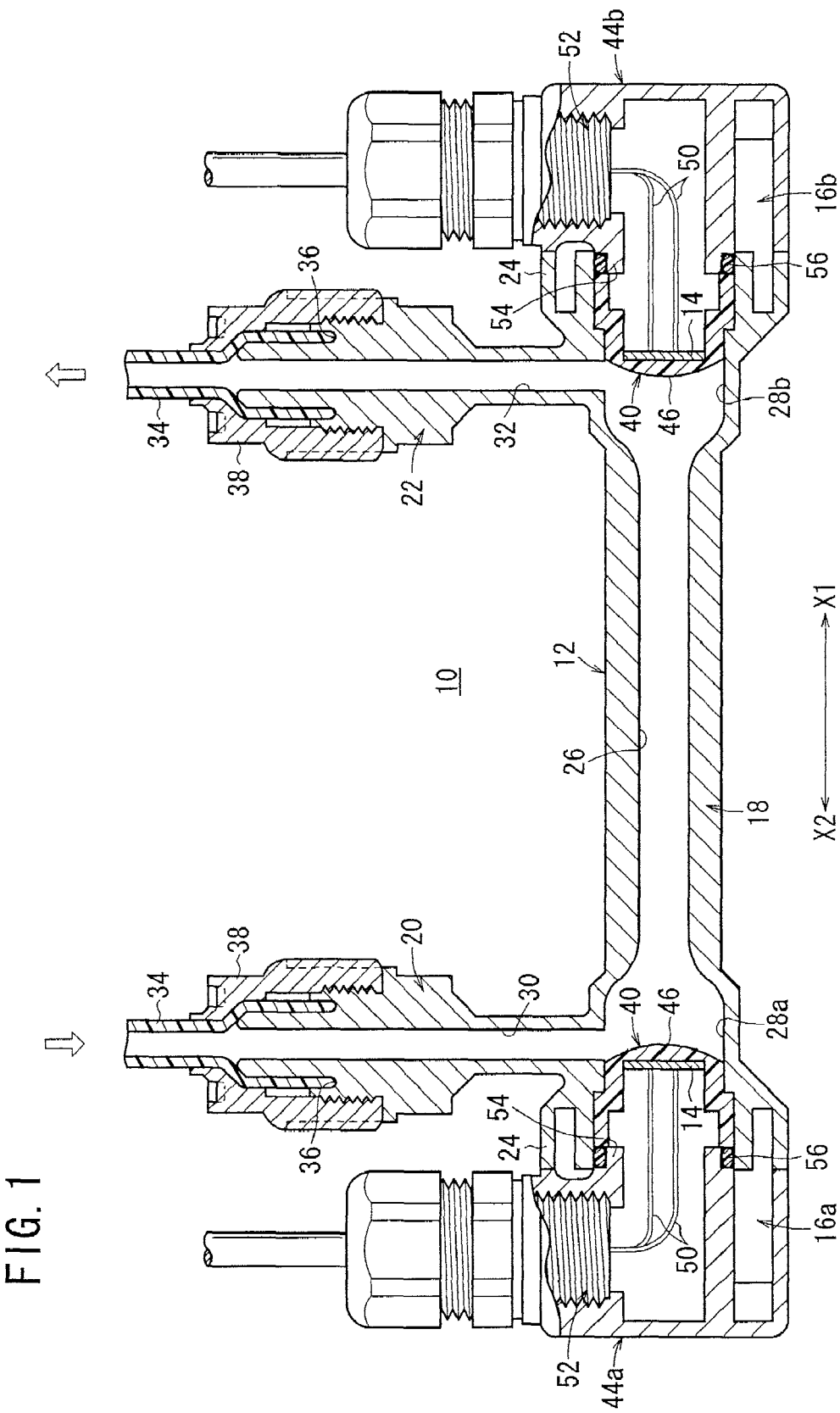
FIG. 1 is a longitudinal sectional view illustrating a flow rate-measuring apparatus in its entirety according to a first embodiment of the present invention.

Referring to FIG. 1, reference numeral 10 indicates a flow rate-measuring apparatus according to the first embodiment of the present invention.

As shown in FIG. 1, the flow rate-measuring apparatus 10 comprises a housing (casing) 12, which has a passage 26 for supplying a liquid such as water or a chemical solution, and a pair of detecting sections 16a, 16b disposed at the respective ends of the housing 12, which contain sonic wave transmitter/receiver sections 14 capable of transmitting and receiving sonic wave signals.

The housing 12 includes a main body section 18 formed, for example, from a metal material such as stainless steel, and which has a linear form, a supply section 20 connected substantially perpendicularly to one end of the main body section 18, and a discharge section 22 connected substantially perpendicularly to another end of the main body section 18. The supply section 20 and the discharge section 22 are disposed substantially in parallel. The housing 12 need not necessarily be formed of a metal material. Alternatively, the housing 12 may be formed of a resin material.

Connecting flanges 24, to which the detecting sections 16a, 16b are connected, are formed at both ends of the main body section 18, the connecting flanges 24 being diametrally expanded outwardly in a radial direction. Further, a passage 26, through which the liquid flows, is formed in an axial direction through the main body section 18, wherein both ends of the passage 26 open to the outside. Diametrically expanded sections 28a, 28b are provided, which gradually expand diametrally toward portions disposed in the vicinity of both ends of the passage 26. More specifically, the diametrally expanded sections 28a, 28b are provided within the connecting flanges 24, wherein the detecting sections 16a, 16b are arranged such that the detecting sections 16a, 16b face the diametrally expanded sections 28a, 28b.

A supply passage 30, which penetrates in the axial direction, is formed in the supply section 20. The supply passage 30 communicates with the diametrally expanded section 28a formed at one side end of the main body section 18. On the other hand, a discharge passage 32, which penetrates in the axial direction, is formed in the discharge section 22. The discharge passage 32 communicates with the diametrally expanded section 28b formed at the other side end of the main body section 18. Stated otherwise, the supply passage 30 and the discharge passage 32 communicate with each other via the passage 26, including the pair of diametrally expanded sections 28a, 28b. Therefore, the liquid, which is supplied from an unillustrated liquid supply source to the supply passage 30, is discharged to the outside via the passage 26 from the discharge passage 32.

A fitting groove 36, to which there is fitted a piping 34 including, for example, a tube, is formed at ends of each of the supply section 20 and the discharge section 22 respectively. A cylindrical tightening plug 38 is threaded onto the outer circumferential surface of each of the ends. That is, the piping 34 is fitted onto the fitting groove 36 at the ends of each of the supply section 20 and the discharge section 22, and the tightening plug 38 is threaded onto each of the ends, whereby the piping 34 is interposed between the tightening plug 38 and the end, and the piping 34 is tightly connected to each of the supply section 20 and the discharge section 22.

Detecting sections 16a, 16b are provided respectively within the diametrally expanded sections 28a, 28b of the housing 12. Each of the detecting sections 16a, 16b includes a cover member 40, which is installed so as to face the passage 26 of the housing 12, a sonic wave transmitter/receiver section 14 arranged inside of the cover member 40, and a connecting cap 44a, 44b connected to the connecting flange 24 of the main body section 18, which closes the open diametrally expanded sections 28a, 28b.

Figure 2:
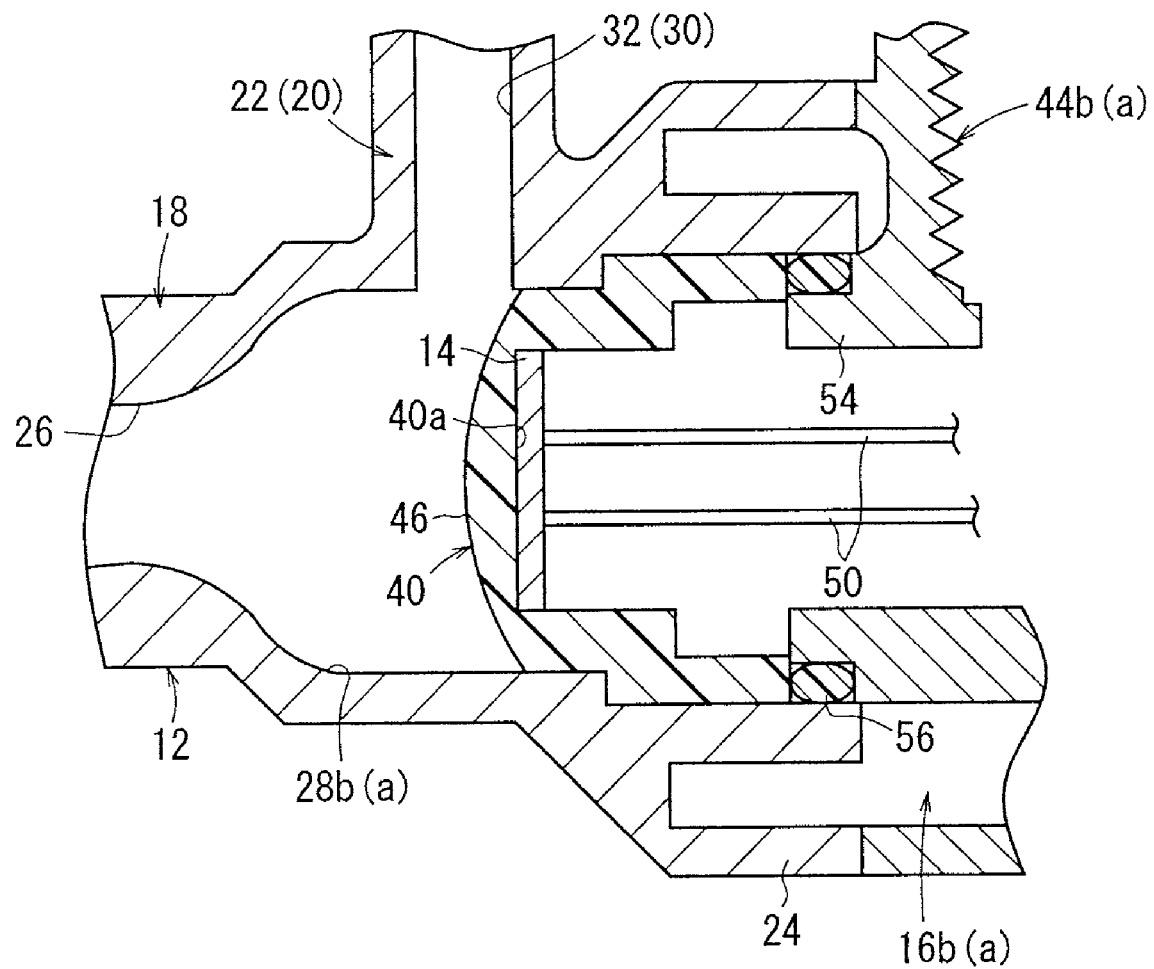
FIG. 2 is a magnified sectional view illustrating elements of the embodiment, which are disposed in the vicinity of a measuring section of the flow rate-measuring apparatus shown in FIG. 1.

Each of the cover members 40 is formed of a resin material having a substantially U-shaped cross section. The cover members 40 are arranged so that open ends thereof are disposed on the side of the connecting caps 44a, 44b. Further, the cover members 40 are arranged so that the other ends thereof, which are formed with a bottomed shape, oppose the passage 26. A curved surface 46, which expands in a spherical form toward the passage 26, is formed at the other end of each of the cover members 40. As shown in FIG. 2, the curved surface 46 is formed to have a predetermined radius, wherein the curved surface 46 faces the passage 26. The curved surface 46 is maximally expanded at a central portion thereof, which is disposed on the axis of the passage 26.

Each of the sonic wave transmitter/receiver sections 14 is composed of, for example, a plate-shaped piezoelectric element (piezo-element). The sonic wave transmitter/receiver sections 14 are installed onto the planar bottom wall surface 40a (see FIG. 2) of each of the cover members 40. A pair of lead wires 50 is connected to each of the sonic wave transmitter/receiver sections 14. The lead wires 50 are led to the inside of the connecting caps 44a, 44b, and then the lead wires 50 are led to the outside via sealing bolts 52, which are threaded onto the connecting caps 44a, 44b.

The connecting caps 44a, 44b are formed with a bottom-equipped cylindrical shape. The connecting caps 44a, 44b are connected respectively to the connecting flanges 24 of the housing 12 by a plurality of bolts (not shown). A fitting section 54 is formed to protrude on a side portion of each of the connecting caps 44a, 44b. Each of the fitting sections 54 is inserted respectively into the diametrally expanded sections 28a, 28b of the housing 12 in order to effect fitting. Lead wires 50, which are connected to the sonic wave transmitter/receiver sections 14, pass through the inside of the fitting sections 54. That is, the sonic wave transmitter/receiver sections 14 are tightly sealed within the diametrally expanded sections 28a, 28b by the connecting caps 44a, 44b, which are connected respectively to the connecting flanges 24 of the housing 12. When the connecting caps 44a, 44b are disengaged, the sonic wave transmitter/receiver sections 14 can be detached from the housing 12.

Seal members 56, which are installed on the outer circumferential surface of the fitting sections 54, abut against the inner circumferential surfaces of the diametrally expanded sections 28a, 28b. Accordingly, an airtight condition is retained between the housing 12 and the connecting caps 44a, 44b.

The sealing bolts 52 that retain the lead wires 50 are threaded to ends of the connecting caps 44a, 44b in order to seal the interior of the connecting caps 44a, 44b. The lead wires 50, which are led outside via the sealing bolts 52, are connected respectively to an unillustrated control unit. Signals that are received by the sonic wave transmitter/receiver sections 14 are output via the lead wires 50 to the control unit.

The flow rate-measuring apparatus 10 according to the first embodiment of the present invention basically is constructed as described above. Next, its operations, functions and effects shall be explained. Liquid is supplied to the apparatus from an unillustrated liquid supply source via piping 34 to the supply passage 30, wherein the liquid flows from the supply passage 30 and via the passage 26 to the discharge passage 32.

In the flow rate-measuring apparatus 10, for example, sonic wave signals are transmitted from the sonic wave transmitter/receiver section 14 of the detecting section 16a, which is connected to one end of the housing 12. The sonic wave signals propagate in the liquid while being reflected by the inner wall surface of the passage 26. The sonic wave signals are received by the sonic wave transmitter/receiver section 14 of the detecting section 16b, which is connected to the other end of the housing 12. During this procedure, the sonic wave signals are propagated in the direction of flow of the liquid (i.e., in the direction of the arrow X1 as shown in FIG. 1).

Conversely, sonic wave signals are transmitted from the sonic wave transmitter/receiver section 14 of the detecting section 16b, which is connected to the other end of the housing 12. The sonic wave signals are received by the sonic wave transmitter/receiver section 14 of the detecting section 16a, which is connected to the aforementioned one end of the housing 12. During this procedure, sonic wave signals are propagated in a direction opposite to the direction of flow of the liquid (i.e., in the direction of the arrow X2 as shown in FIG. 1).

The received signals, which are based on sonic wave signals received by the sonic wave transmitter/receiver sections 14, are output to an unillustrated control unit via the lead wires 50. According to such detection signals, the difference in propagation time $\Delta T$ is calculated in the control unit, on the basis of the propagation time T1 obtained when sonic wave signals are propagated in the direction of flow of the liquid (direction of the arrow X1) and the propagation time T2 obtained when sonic wave signals are propagated in a direction (direction of the arrow X2) opposite to the direction of flow of the liquid. The flow velocity V of the liquid is calculated from the difference in propagation time $\Delta T$.

In this arrangement, a curved surface 46, which expands toward and opposes the passage 26, is formed on each of the cover members 40 making up the detecting sections 16a, 16b. Therefore, any bubbles contained in the liquid adhere to the cover members 40, whereupon the bubbles are pressed by the flowing liquid. Accordingly, the bubbles gradually move radially outwardly along the curved surface 46. Stated otherwise, it is possible to avoid a condition in which bubbles adhere to the surface of the cover member 40 and cover the sonic wave transmitter/receiver section 14. Bubbles that are removed from the cover member 40 can be discharged to the outside from the discharge passage 32.

Therefore, since bubbles that adhere to the surface of the cover members are removed, propagation of the sonic wave signals is not inhibited. Therefore, it is possible to appropriately transmit and receive sonic wave signals in the flow rate-measuring apparatus 10. As a result, the flow rate of the liquid can be calculated highly accurately on the basis of such sonic wave signals.

Figure 3:
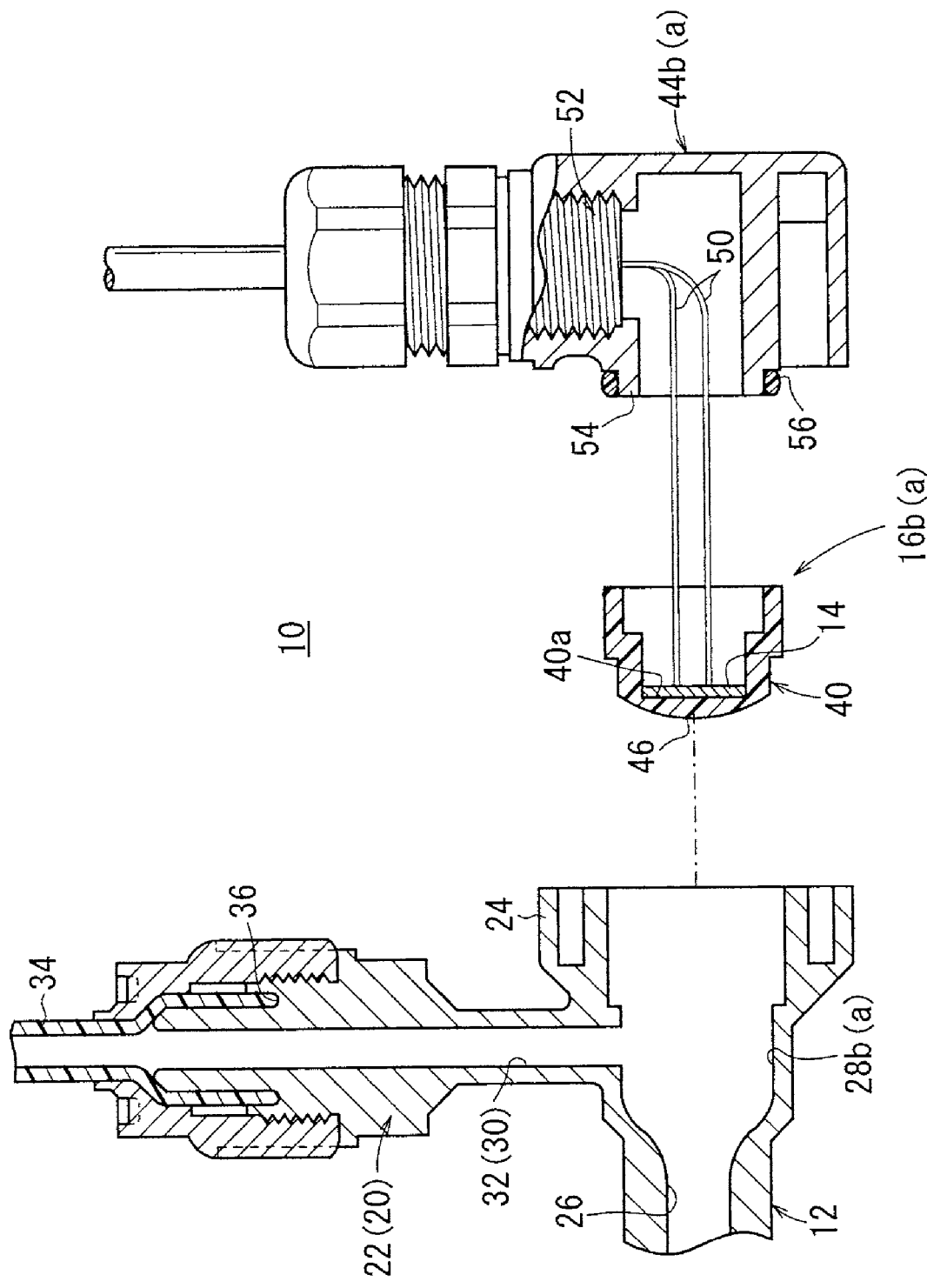
FIG. 3 is a magnified sectional view illustrating a state in which the measuring section is disengaged from a housing portion of the flow rate-measuring apparatus shown in FIG. 1.

With this arrangement, the detecting sections 16a, 16b including the sonic wave transmitter/receiver sections 14 are installed in the diametrically expanded sections 28a, 28b, which open at both ends of the housing 12, wherein the diametrically expanded sections 28a, 28b are closed by the connecting caps 44a, 44b. That is, as shown in FIG. 3, the detecting sections 16a, 16b are disposed detachably with respect to the housing 12. Accordingly, when the detecting sections 16a, 16b are exchanged, such an exchange can be performed by means of the simple operation, in which the connecting caps 44a, 44b simply are detached from the housing 12.

Even when malfunctions occur in one or both of the detecting sections 16a, 16b, the flow rate-measuring apparatus 10 can easily be repaired and used again, merely by exchanging one or both of the detecting sections 16a, 16b of the flow rate-measuring apparatus 10. Therefore, it is possible to reduce costs, as compared with a case in which the entire flow rate-measuring apparatus 10 must be replaced.

Further, the cover members 40 are formed of a resin material. Accordingly, sonic wave signals can be reliably transmitted and received by the sonic wave transmitter/receiver sections 14 that are disposed inside of the cover members 40.

Next, a flow rate-measuring apparatus 100 according to a second embodiment shall be described with reference to FIGS. 4 to 6. The same constitutive components as those of the flow rate-measuring apparatus 10 according to the first embodiment described above shall be designated using the same reference numerals, and detailed explanations of such features shall be omitted.

Figure 4:
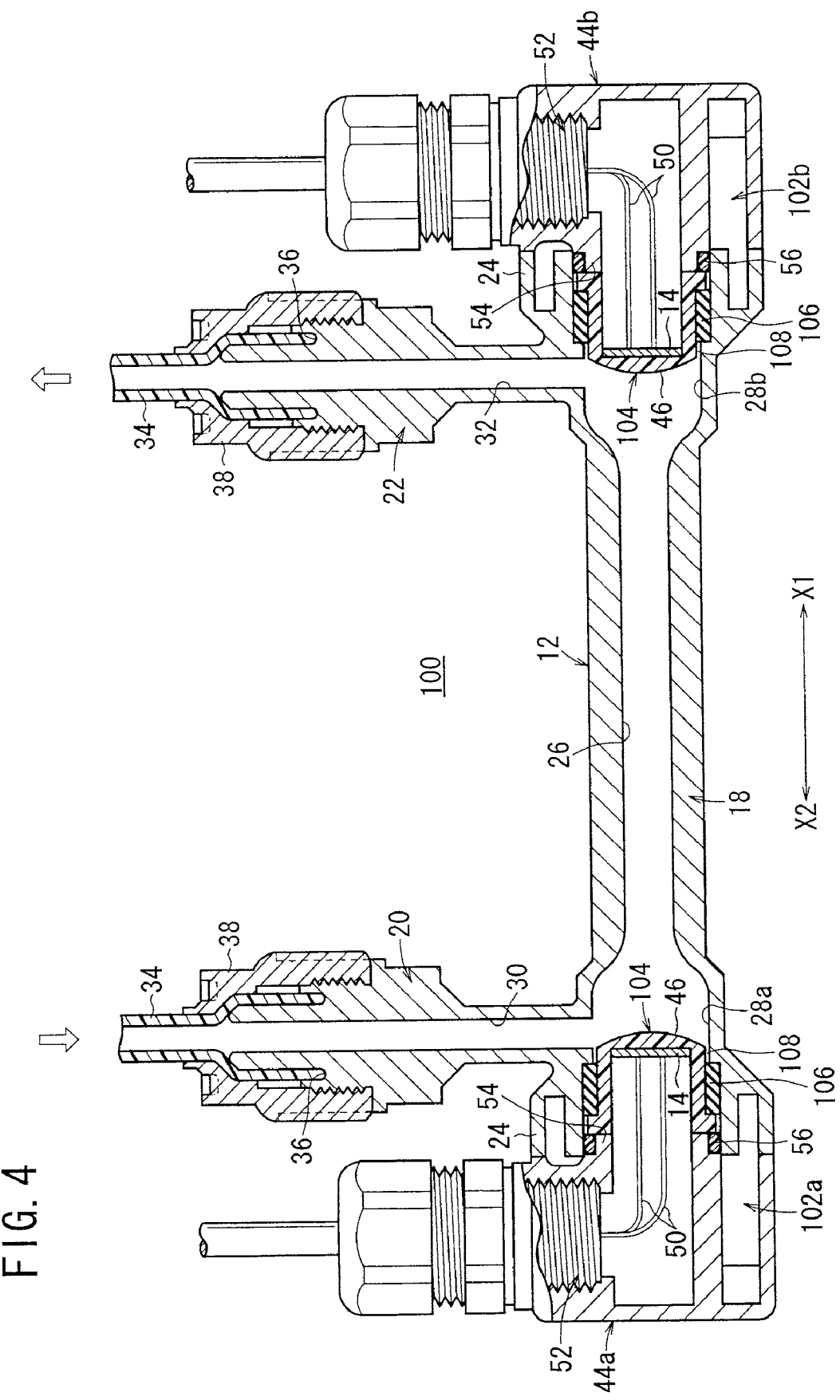
FIG. 4 is a longitudinal sectional view illustrating a flow rate-measuring apparatus in its entirety according to a second embodiment of the present invention.

As shown in FIG. 4, the flow rate-measuring apparatus 100 according to the second embodiment differs from the flow rate-measuring apparatus 10 according to the first embodiment in that damping members (sonic wave shutoff members) 106 are disposed between the cover members 104 making up the detecting sections 102a, 102b and the diametrally expanded sections 28a, 28b of the housing 12. Clearances 108 of a predetermined distance are provided between outer circumferential surfaces of the cover members 104 and the inner circumferential surfaces of the diametrally expanded sections 28a, 28b.

The damping member 106 is formed, for example, of an elastic material such as rubber, wherein the damping member 106 has a cylindrical shape. The damping member 106 is disposed between the outer circumferential surface of the cover member 104 and the inner circumferential surface of the diametrically expanded sections 28a, 28b.

The damping member 106 is disposed such that the outer circumferential surface and the inner circumferential surface thereof make surface-to-surface contact with the cover member 104 and the main body section 18 respectively. Therefore, the cover members 104 do not come into direct contact with the housing 12. The cover members 104 are retained in the housing 12 with the damping members 106 intervening therebetween.

Figure 5:
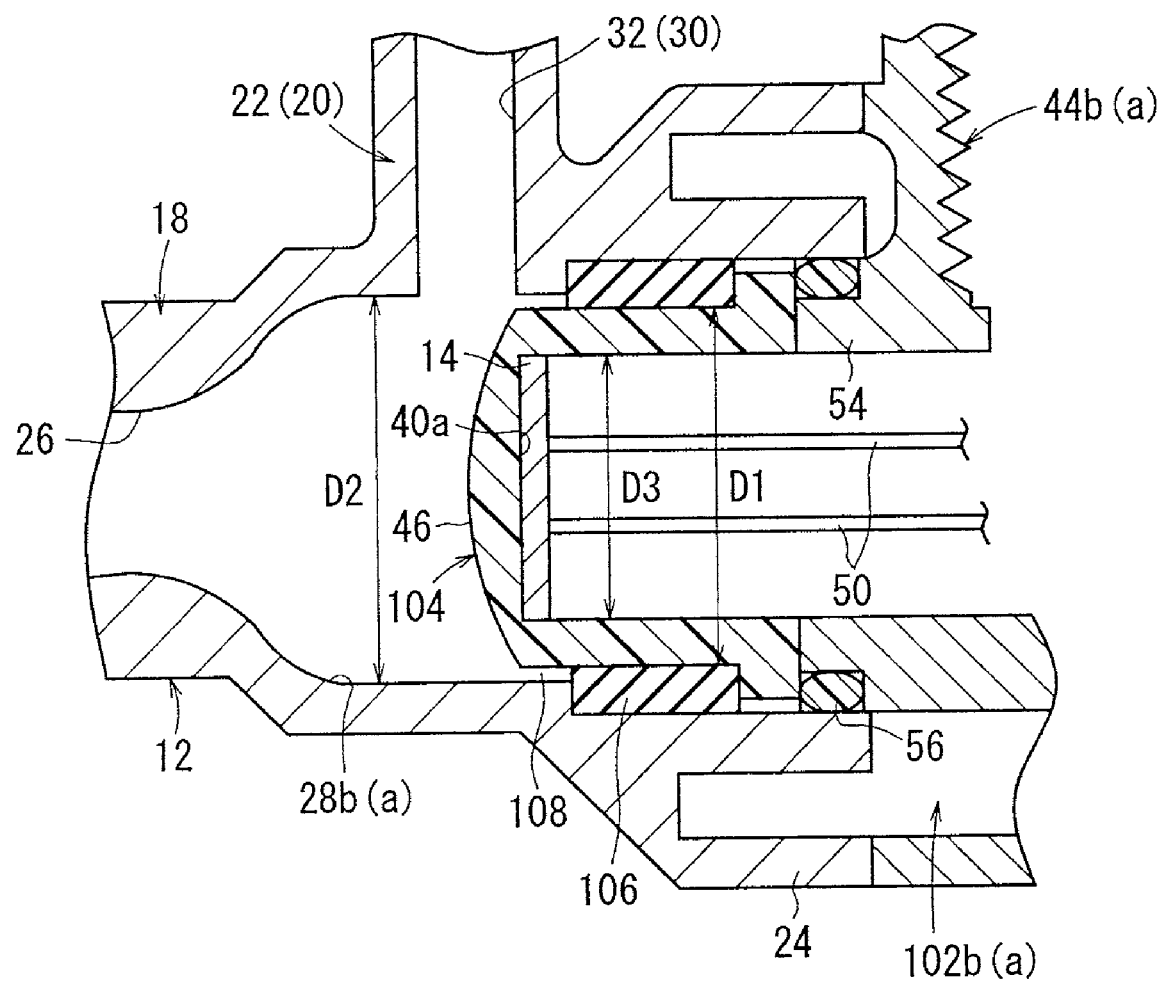
FIG. 5 is a magnified sectional view illustrating elements of the embodiment, which are disposed in the vicinity of a measuring section of the flow rate-measuring apparatus shown in FIG. 4.
Figure 6:
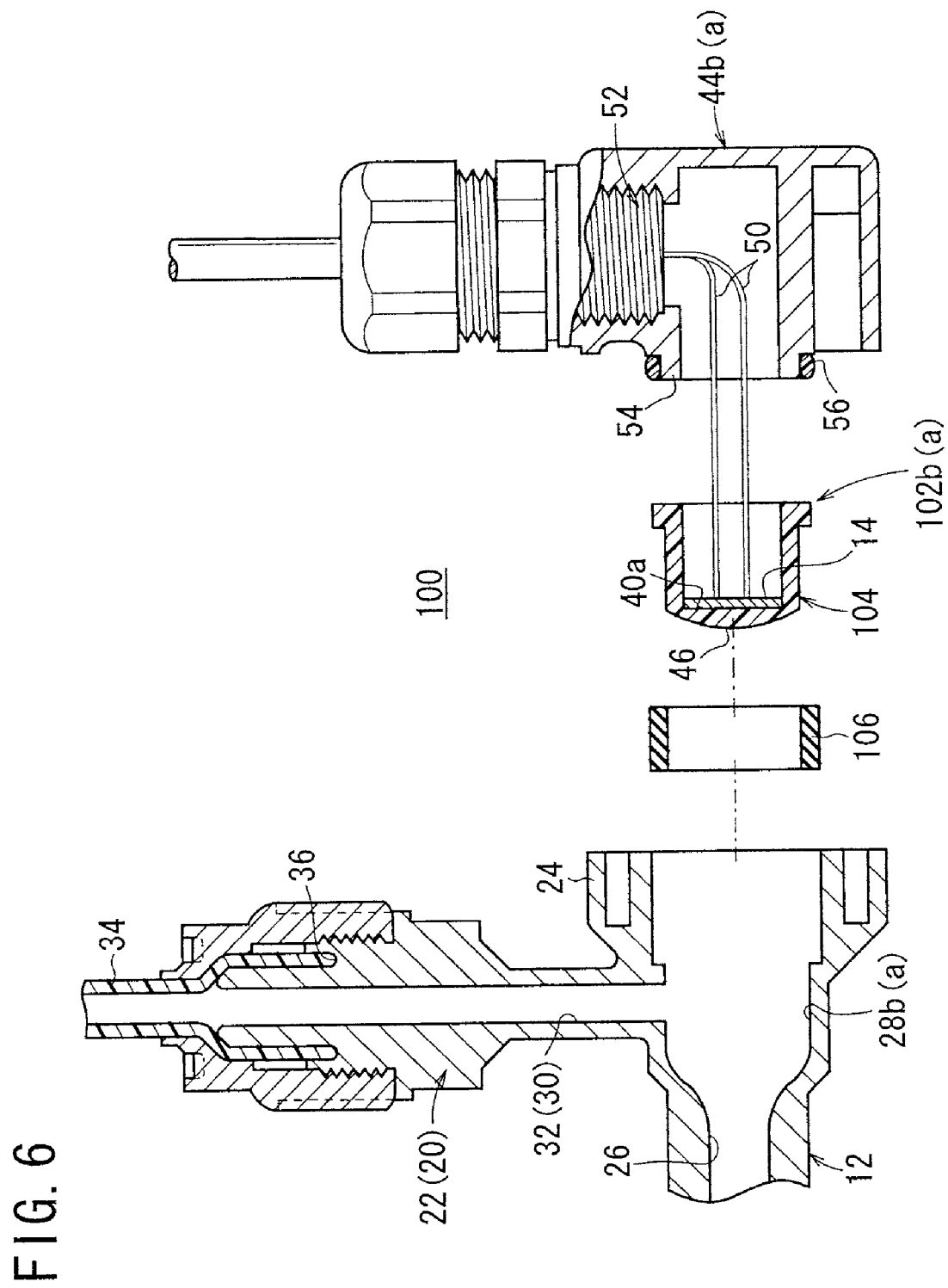
FIG. 6 is a magnified sectional view illustrating a state in which the measuring section is disengaged from a housing portion of the flow rate-measuring apparatus shown in FIG. 4.

As shown in FIG. 5, the outer circumferential diameter D1 of the cover member 104 is smaller than the inner circumferential diameter D2 of the diametrally expanded sections 28a, 28b that constitute portions of the passage 26 (D1<D2). A clearance 108 of the predetermined distance is provided between the outer circumferential surface of the cover member 104 and the inner circumferential surface of the diametrally expanded sections 28a, 28b. In other words, the cover members 104 are separated from the diametrally expanded sections 28a, 28b by a predetermined distance, so that the other end of the cover member 104 does not come into contact with the diametrally expanded sections 28a, 28b. Similarly, the outer circumferential diameter D3 of the sonic wave transmitter/receiver section 14 is designed to be smaller than the inner circumferential diameter D2 of the diametrally expanded sections 28a, 28b (D3<D2).

The clearance 108, which faces the diametrally expanded sections 28a, 28b, is disposed between the cover member 40 and the diametrally expanded sections 28a, 28b, as described above. Accordingly, the cover member 40 is prevented from making contact with the housing 12, which includes the passage 26 and the diametrally expanded sections 28a, 28b. Thus, it is possible to avoid propagation of interfering sonic wave signals from the housing 12 to the detecting sections 16a, 16b.

The cover members 40 are retained in the housing 12 with the damping member 106, which is composed of the elastic material, intervening therebetween. Therefore, interfering sonic wave signals, which differ from the inherent sonic wave signals intended to be received, are appropriately shut off by the damping member 106, so as to avoid propagation thereof from the housing 12 to the cover members 40. Therefore, it is possible to avoid problems caused by such interfering sonic wave signals being transmitted from one sonic wave transmitter/receiver section 14 and propagated via the cover member 40 to the housing 12. Only sonic wave signals that are propagated to the passage 26 having the liquid flowing therethrough can reliably be received by the other sonic wave transmitter/receiver section 14. Accordingly, it is possible to highly accurately measure the flow rate of the liquid on the basis of such sonic wave signals.

When the housing 12 is formed of a metal material, it is possible to increase the strength thereof as compared with the conventional flow rate-measuring apparatus 1, in which the measuring conduit 2 is formed of plastic. Therefore, even when the liquid that flows through the passage 26, the supply passage 30, and the discharge passage 32 formed in the housing 12 has a high pressure, the flow rate of the liquid can appropriately be measured using the flow rate-measuring apparatus 100 according to the second embodiment.

Figure 7:
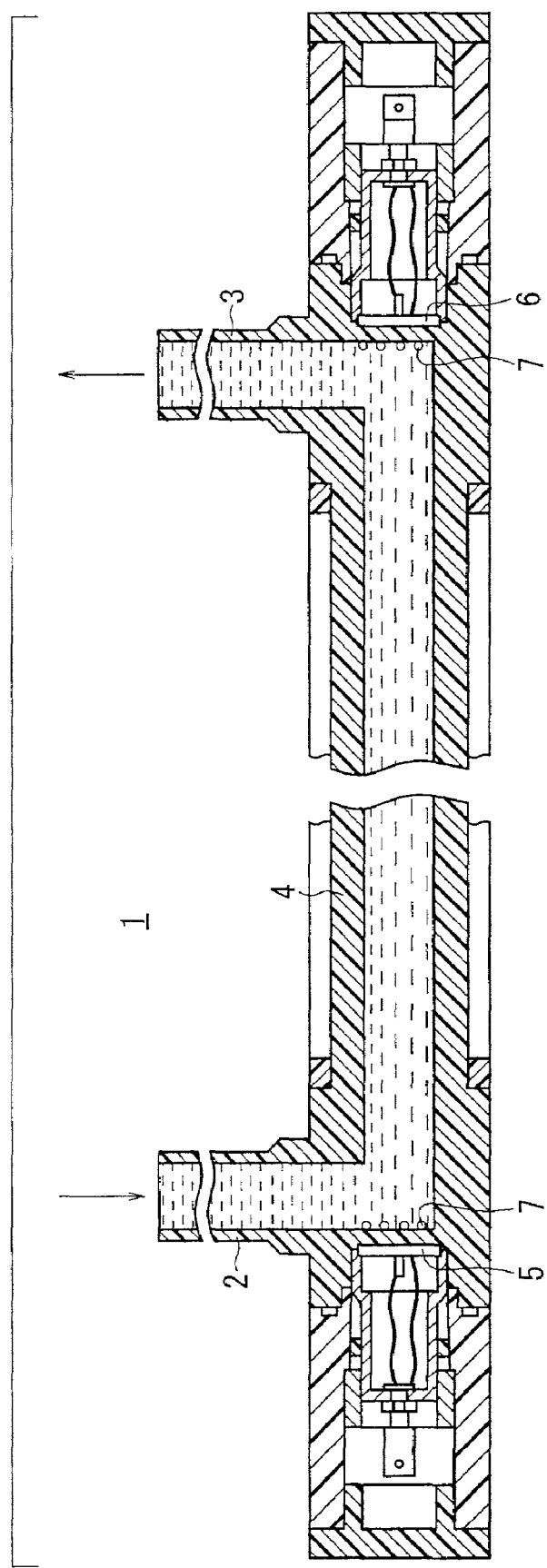
FIG. 7 is a longitudinal sectional view illustrating a conventional flow rate-measuring apparatus.

Further, the outer circumferential diameter D1 of the cover member 40 and the outer circumferential diameter D3 of the sonic wave transmitter/receiver section 14 are designed so as to be smaller than the inner circumferential diameter D2 of the diametrally expanded sections 28a, 28b (D1, D3<D2). Accordingly, sonic wave signals can appropriately be transmitted from the sonic wave transmitter/receiver section 14 into the diametrally expanded section 28a, 28b. Further, the propagated sonic wave signals can appropriately be received by the sonic wave transmitter/receiver section 14 via the diametrally expanded section 28a, 28b. Therefore, the flow rate of the liquid can be measured reliably and highly accurately on the basis of the sonic wave signals. In other words, in the case of the flow rate-measuring apparatus 1 according to the conventional technique shown in FIG. 7, the outer circumferential diameters of the first and second measuring heads 5, 6 are larger than the inner circumferential diameter of the passage formed in the measuring conduit 2. Therefore, sonic wave signals that are propagated via the liquid within the passage cannot be received reliably by the first and second measuring heads 5, 6.

The relationship between the inner circumferential diameter D2 of the diametrally expanded sections 28*a*, 28*b* and the outer circumferential diameter D3 of the sonic wave transmitter/receiver section 14, as described above, is not limited to the flow rate-measuring apparatus 100 according to the second embodiment. The relationship between the inner circumferential diameter D2 and the outer circumferential diameter D3 may also be provided equivalently within the flow rate-measuring apparatus 10 according to the first embodiment, which has no damping member 106. Accordingly, in the flow rate-measuring apparatus 10 as well, sonic wave signals can appropriately be transmitted from the sonic wave transmitter/receiver section 14 to the diametrally expanded sections 28*a*, 28*b*. Further, propagated sonic wave signals can appropriately be received by the sonic wave transmitter/receiver section 14 via the diametrally expanded sections 28*a*, 28*b*.

Although certain preferred embodiments of the present invention have been shown and described in detail, it should be understood that various changes and modifications may be made therein without departing from the scope of the appended claims.

What is claimed is:

1. A flow rate-measuring apparatus comprising a passage through which a liquid flows and which is provided in a casing, and a pair of detecting sections capable of transmitting and receiving sonic wave signals, which are arranged in opposition to each other with said passage intervening therebetween, for measuring a flow rate of said liquid on the basis of said sonic wave signals, each of said detecting sections further comprising:
   a cover member that faces said passage disposed in said casing, and which has a curved surface expanded toward said passage; and
   a sonic wave transmitter/receiver member disposed in said cover member so as to be directed toward said passage, and which transmits and receives said sonic wave signals,
   wherein said sonic wave transmitter/receiver member transmits and receives said sonic wave signals via said curved surface.

2. The flow rate-measuring apparatus according to claim 1, wherein said detecting section is disposed detachably within said casing.

3. The flow rate-measuring apparatus according to claim 2, wherein an outer diameter (D3) of said sonic wave transmitter/receiver member is smaller than an inner diameter (D2) of said passage.

4. The flow rate-measuring apparatus according to claim 3, wherein said casing is composed of a metal material.

5. The flow rate-measuring apparatus according to claim 3, wherein said cover member is formed of a resin material.

6. The flow rate-measuring apparatus according to claim 5, wherein said sonic wave transmitter/receiver member comprises a piezoelectric element.

7. The flow rate-measuring apparatus according to claim 1, wherein a sonic wave shutoff member, which shuts off propagation of said sonic wave signals, is provided between said detecting section and said casing, wherein said detecting section is retained in said casing with said sonic wave shutoff member intervening therebetween.

8. The flow rate-measuring apparatus according to claim 7, wherein said detecting section is disposed detachably within said casing.

9. The flow rate-measuring apparatus according to claim 8, wherein an outer diameter of said detecting section is smaller than an inner diameter of said casing in which said detecting section is installed.

10. The flow rate-measuring apparatus according to claim 9, wherein a clearance facing said passage is provided between an outer circumferential surface of said cover member and an inner circumferential surface of said passage.

11. The flow rate-measuring apparatus according to claim 10, wherein said sonic wave shutoff member is formed of an elastic material.

12. The flow rate-measuring apparatus according to claim 11, wherein said casing is composed of a metal material.

13. The flow rate-measuring apparatus according to claim 12, wherein said cover member is formed of a resin material.

14. The flow rate-measuring apparatus according to claim 13, wherein said sonic wave transmitter/receiver member comprises a piezoelectric element.

* * * * *